(12) United States Patent
Derenoncourt

(10) Patent No.: US 9,103,085 B2
(45) Date of Patent: Aug. 11, 2015

(54) OIL SPILL RECOVERY SYSTEM AND METHOD

(71) Applicant: Franck Derenoncourt, Montreal (CA)

(72) Inventor: Franck Derenoncourt, Montreal (CA)

( * ) Notice: Subject to any disclaimer, the term of this patent is extended or adjusted under 35 U.S.C. 154(b) by 270 days.

(21) Appl. No.: 13/729,012

(22) Filed: Dec. 27, 2012

(65) Prior Publication Data

US 2014/0183145 A1 Jul. 3, 2014

Related U.S. Application Data

(60) Provisional application No. 61/664,836, filed on Jun. 27, 2012.

(51) Int. Cl.

| | | |
|---|---|---|
| *E02B 15/04* | (2006.01) | |
| *B01D 17/02* | (2006.01) | |
| *E02B 15/10* | (2006.01) | |
| *E21B 43/01* | (2006.01) | |
| *B63B 35/32* | (2006.01) | |
| *B63B 35/00* | (2006.01) | |
| *B63G 8/00* | (2006.01) | |

(52) U.S. Cl.
CPC .......... *E02B 15/046* (2013.01); *B01D 17/0214* (2013.01); *B63B 35/32* (2013.01); *E02B 15/045* (2013.01); *E02B 15/106* (2013.01); *E21B 43/0122* (2013.01); *B63B 2035/007* (2013.01); *B63G 2008/007* (2013.01)

(58) Field of Classification Search
CPC ..... E02B 15/04; E02B 15/045; E02B 15/046; E02B 15/10; E02B 15/106; B63B 35/32; B63B 2035/008; E01H 12/006; E21B 43/0122; B01D 17/0211; B01D 17/0214
USPC .............. 210/170.05, 170.09, 170.11, 242.3, 210/521, 538, 540, 747.6, 776, 923
See application file for complete search history.

(56) References Cited

U.S. PATENT DOCUMENTS

| | | | | | |
|---|---|---|---|---|---|
| 3,844,944 | A | * | 10/1974 | Mercuri | 210/242.3 |
| 3,847,816 | A | * | 11/1974 | DiPerna | 210/242.3 |
| 4,182,679 | A | * | 1/1980 | Van Hekle | 210/242.3 |
| 4,554,070 | A | * | 11/1985 | Jordan | 210/242.3 |
| 4,851,133 | A | * | 7/1989 | Rymal | 210/242.3 |
| 5,149,443 | A | * | 9/1992 | Varnam | 210/170.05 |
| 6,221,256 | B1 | * | 4/2001 | Kimura | 210/747.6 |
| 6,592,753 | B2 | * | 7/2003 | Lee | 210/242.3 |
| 7,597,811 | B2 | * | 10/2009 | Usher | 210/923 |
| 2011/0042323 | A1 | * | 2/2011 | Sullivan, II | 210/242.3 |

* cited by examiner

*Primary Examiner* — Christopher Upton

(57) ABSTRACT

An oil spill cleanup system has a vessel, a separator within the vessel for separating oil and water, a pump for pumping an oil/water mixture into the separator, and one or more probes and submersibles having hoses connected to the pump, for collecting the oil/water mixture. The separator has two or more adjacent tanks, for containing the oil/water mixture. Gravity separates the oil from water in the first tank and the water is evacuated from the bottom, while the oil overflows in the second tank, having an increased oil concentration, and so on, until the pure oil is evacuated. A mobile oil platform is also disclosed, having a subsea well connected to a hose, the hose carrying oil to a vessel, wherein the vessel receives the oil and is exchangeable with an empty vessel when full. When the vessel drops the hose, floats maintain the location thereof.

11 Claims, 12 Drawing Sheets

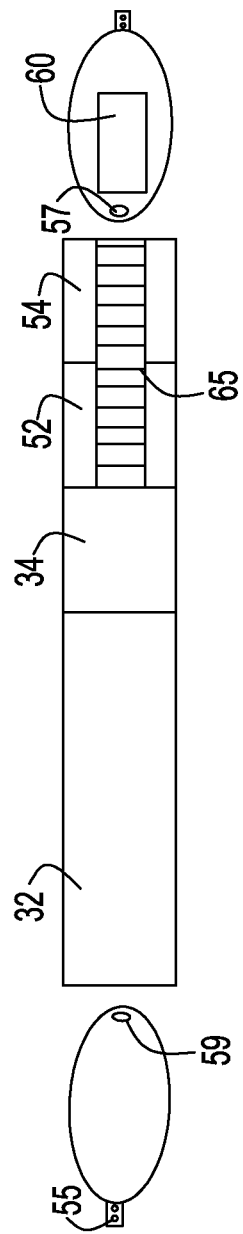
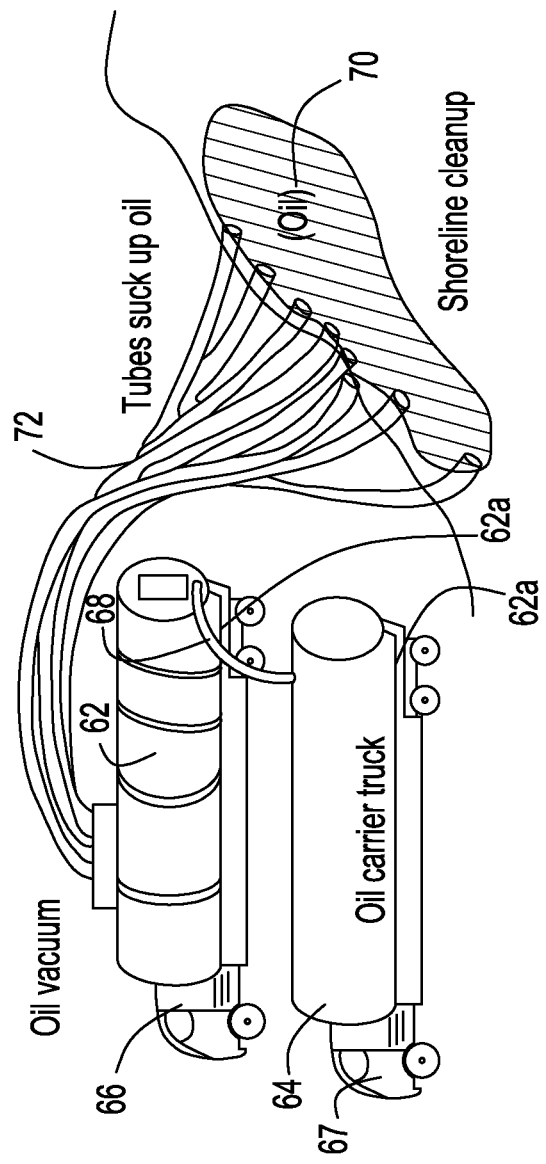

OIL SPILL RECOVERY SYSTEM AND METHOD

This application claims the benefit of U.S. Provisional Application No. 61/664,836, filed Jun. 27, 2012, and Canadian Patent Application No. 2,781,856, filed Jul. 12, 2012, which are hereby incorporated by reference in their entireties.

FIELD

The invention is in the field of oil spill cleanup, particularly oil spill cleanup and recovery by hydraulic separation.

BACKGROUND

Marine drilling for oil has expanded exponentially in recent decades, due to the technologically-facilitated accessibility to undersea reserves. However, with such drilling comes the risk of oil spills such as the Exxon Valdez incident that was a surface spill from a tanker, and the BP Deepwater Horizon spill, which occurred both at the surface and deep under the sea.

Oil spills cause mass amounts of environmental damage and it is extremely time consuming, expensive and generally difficult to clean up the mess left in their wake. Often oil spills occur in hostile environments such as the sea subject to storms or in the far north. Prior art oil spill technologies include adding dispersants to disperse the spill, containing the spill and burning the oil. In these cases, the oil is lost, which may result in a significant loss in addition to the cleanup costs.

In the past, the address oil spills authorities have sucked the oil/water mixture directly into trucks or barges, wherein the mixture contained 95% water and 5% oil, and either destroying the mixture reclaimed or separating the oil from the water offsite. This is very inefficient due to the high transportation costs. Further, barging and booming was commonly practiced by authorities; however the booms and the barges couldn't protect the coastline because oil spill constantly went overboard due to heavy blowing wind. As oil has monetary value, a recovery method is preferable to destruction of the oil that also leaves potentially toxic by-products in the environment.

The cleanup procedure becomes even more challenging when a supervisor has to be present at the spill site for the duration of the process. Further, some of the most skilled cleanup specialists are only available remotely.

There is therefore a need for an oil cleanup system which vacuums up the mixture of spilled oil and water, and separates the oil from the water for processing and resale, before returning the clean water to the sea. Further there is a need for such a system that may be operated remotely.

More and more, fixed oil platforms are being replaced by mobile oil platforms, connected to a subsea well by a flexible hose, which enables the platform to move with the water without becoming disconnected to the well. There are risks that the hose break or become disconnected underwater and leak oil into the sea. Prior art means of finding the hose break are limited to checking along the high structure over the well. The hose flow could be stopped at various checkpoints along the hose length, as well, so that parts of the hose could be replaced without the requirement of replacing the whole hose, however finding the broken hose end was still a problem.

Therefore, there is also a need for a means of retrieving a broken subsea hoses in order to minimize the spilling of oil into the sea.

SUMMARY

An oil spill cleanup system is disclosed comprising a vessel; a separator within the vessel for separating oil and water, the separator further comprising two or more adjacent tanks, having first and last tanks, the tanks in overflowing communication; and a water evacuation valve on a lower portion of the first tank with a filter between the valve and the first tank; a pump for creating a vacuum and pumping an oil/water mixture into the separator; and one or more floating probes having hoses connected to the pump, for collecting the oil/water mixture wherein the pumps pumps the oil/water mixture into the top of the separator, the oil/water mixture separates within the separator such that the oil floats on the water, and the surface oil overflows into the adjacent tank, and the water is evacuated from the water evacuation valve.

An embodiment further comprises one or more submersibles connected by a hose to the pump, for collecting the oil/water mixture. The probes may be remotely controlled and manoeuvrable to the oil/water mixture, and each probe has a camera to identify areas of high oil concentration. The system may have an oil evacuation valve on the last tank. The vessel may be a ship or a truck.

A method for oil spill cleanup comprising: deploying one or more probes into the oil spill for sucking an oil/water mixture; sucking the oil/water mixture into a separator; gravity separating the oil/water mixture into oil and water; and evacuating the separated water. The method may further comprise the step of deploying a submersible into a subsea oil spill for sucking the oil/water mixture, or may further comprise the step of controlling the one or more probes remotely, using a camera. The method also may further comprise the step of controlling the one or more submersibles remotely, using a camera. In an embodiment, the separator may comprise two or more tanker trucks.

A mobile oil platform is disclosed, comprising: a vessel for holding oil; a subsea hose connected to a subsea well; a pump mounted on the vessel for detachably connecting to the subsea hose and for pumping oil into the vessel; one or more floats connected to the subsea hose by cables for holding the end of the subsea hose, wherein the subsea hose is detachably connected to the vessel and when full, the vessel detaches the hose such that the floats hold the hose in the sea, and the full vessel is replaced by an empty vessel.

A method of hose management for the mobile platform is disclosed comprising: retrieving one or more floats connected to a subsea well hose by cables; pulling the cables from the sea to retrieve the connected hose; and connecting the hose to a platform. The method may further comprise: detaching the hose from the platform; attaching the cables connected to the one or more floats to the hose; and dropping the hose in the water wherein the floats mark a hose position. In an embodiment, the floats are gas bags.

The method may further comprise: deploying one or more probes into an oil spill for sucking an oil/water mixture; sucking the oil/water mixture into a separator; gravity separating the oil/water mixture into oil and water; and evacuating the separated water. In an embodiment, the method further comprises the step of deploying a submersible into a subsea oil spill for sucking the oil/water mixture. It may also further comprise the step of controlling the one or more probes remotely, using a camera, or controlling the one or more submersibles remotely, using a camera.

DESCRIPTION OF FIGURES

FIG. 9b shows a plan view of the separator, according to one embodiment of the present invention;

FIG. 10a shows a perspective view of the dual truck separator, according to one embodiment of the present invention;

DETAILED DESCRIPTION

The word "vessel" includes in its meaning oil tanker ships and converted separator ships, oil carrier trucks, separator trucks or oil carrier trucks carried on a ship.

Figure 1:
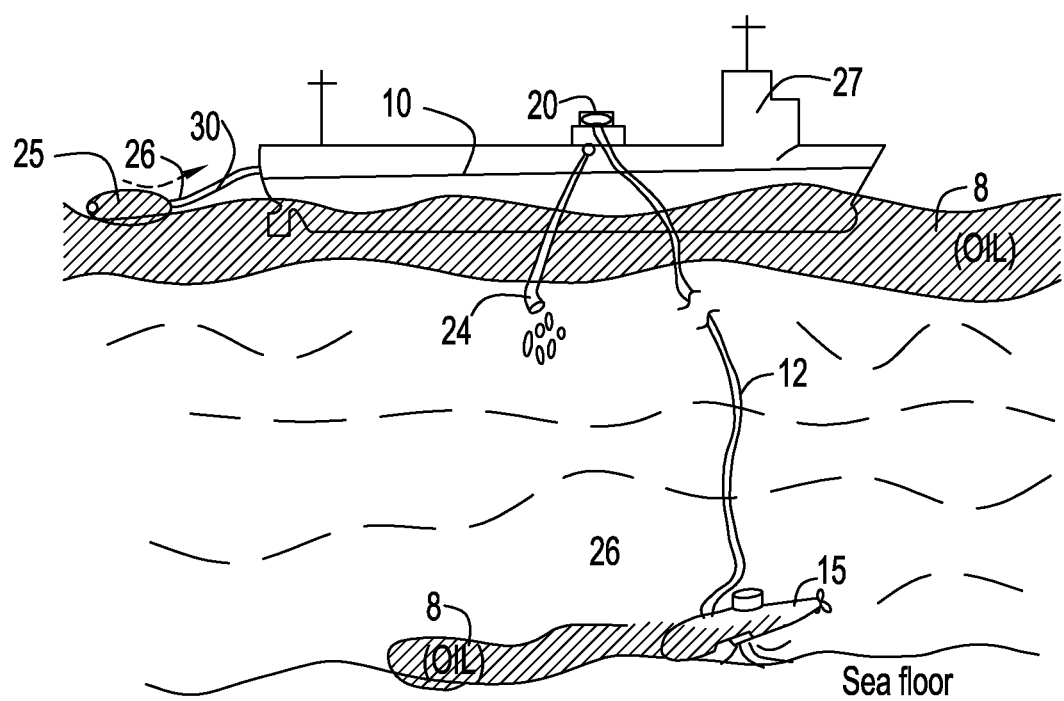
FIG. 1 shows the oil spill recovery system, according to one embodiment of the present invention.
Figure 2:
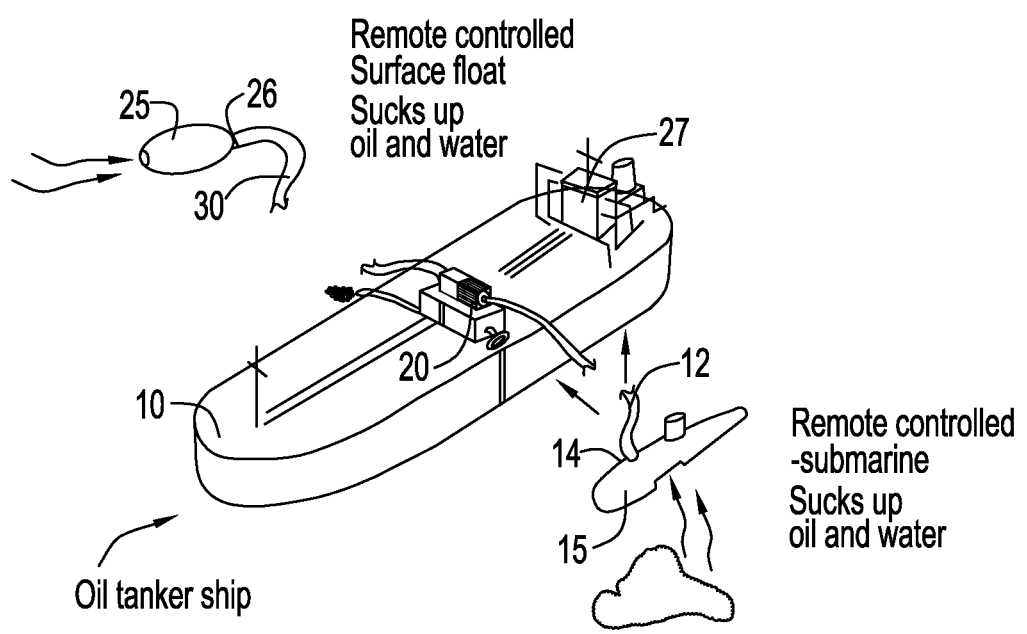
FIG. 2 shows a perspective view of the oil spill recovery system, according to one embodiment of the present invention.

The described oil spill cleanup system provides an efficient way to clean up an oil spill that can be operated remotely from within a control room on a ship or on a truck, for example. Depending on the scale required, the ship may be as large as an oil tanker or much smaller, with lower operating costs and greater agility. With reference to FIGS. 1 and 2 the separator ship 10 is shown floating within an oil spill 8. The ship 10 has a submarine hose 12 having a coupler 14 for connection to a remote-controlled submersible 15. The coupler facilitates use of different length or thickness of hoses. The submersible 15 has no passengers, therefore need not be pressurized, and is thus capable of descending beyond 10000 m, able to probe the deepest regions of the sea. Assuming an undersea spill, the submersible is directed to the source of the spill and vacuums the spill up through the hose 12. The hose 12 is a durable oil-resistant hose that may be reeled out to the depth desired, beyond 10000 m in some cases. A pump 20 on the ship 10 pulls the oily water from the hose 12 and into the ship 10. The submersible 15 directs the hose 12 to the spill, and pumping water from the spill into the ship is performed by the pump 20 on the ship. The submersible 15 may be robotic in that, once the location of the undersea spill is provided, it is able to direct itself to the spill without user intervention. As will be seen below, within the ship is a mechanism to separate the oil and water. The resulting oil-free water is returned to the sea by a nozzle 24.

Figure 3:
FIG. 3 shows the technician within a remote cleanup control centre, according to one embodiment of the present invention.

Further, at least one surface probe 25 is deployed within the spill waters surrounding the ship 10. The probe 25 is remote controlled such that it may be steered to areas of greatest oil density. The control may be from any remote location, however preferably located in the ship bridge 27. As shown in FIG. 3, the cleanup technician, in front of his deck, has live videos of the oil spill area from the probe and from the ship; therefore, the cleanup operating room may be anywhere in the world. The surface hose 30 is connected to the probe 25 by means of a hose connector, which facilitates changing the hose for longer or shorter, or different hose characteristics. The probe 25 is then connected to the pump 20 by the hose 30. The probe directs the hose 30 to a desired location, and the pump 20 then sucks the oil/water mixture into the ship 10 for separation.

The probe 25 may simply comprise a float that floats around the spill waters and sucks up the oil/water mixture on the surface. In an embodiment, the surface hose 30 may be directed by personnel in a small motorboat or other vehicle. There may be a plurality of surface hoses, fanning out around the ship 10 in order to cover a broader area.

Figure 4:
FIG. 4 shows a plan view of a surface probe, according to one embodiment of the present invention.
Figure 5:
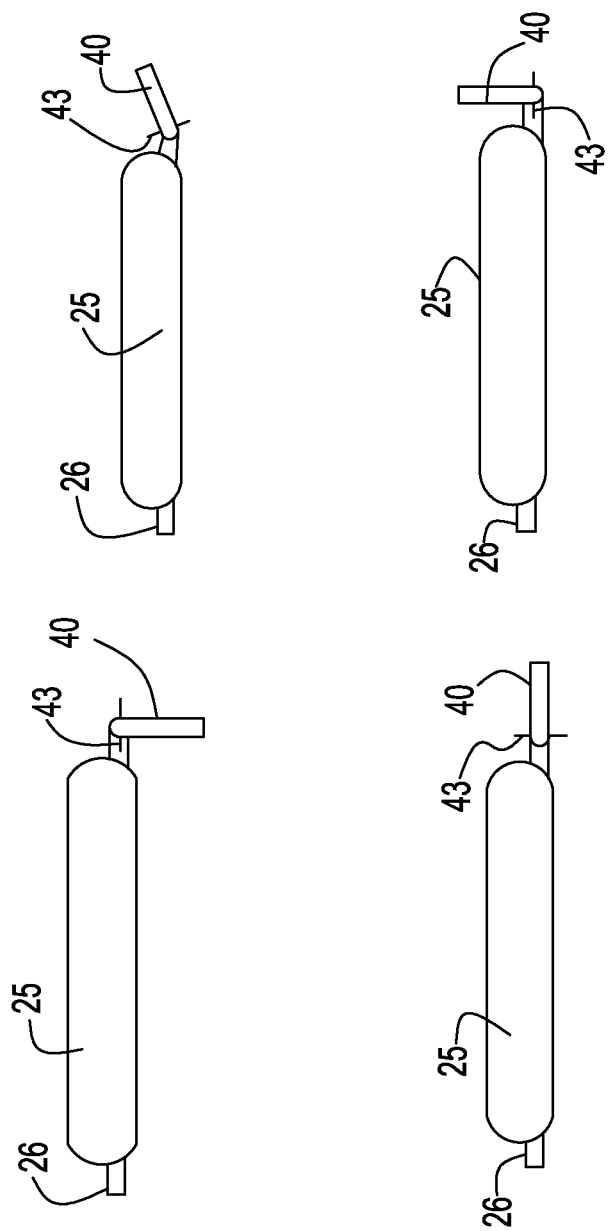
FIG. 5 shows an elevation view of a surface probe, according to one embodiment of the present invention.

With reference to FIGS. 4 and 5, an embodiment of the surface probe 25 is shown. The probe 25 is operable on either side, therefore is able to withstand rough seas which may flip it over. The probe body 28 floats as it is filled with foam or gas, or having sealed floats therein. The float has a hose connector 26 for the hose 30. At the end opposite the hose connector 26, is a sucking tube 40 for sucking the oil/water surface mixture. In one embodiment, the sucking tube 40 is movable and manoeuvrable into the oil nearby, as seen in FIG. 4. Further, the sucking tube 40 may have a camera 42 for identifying the locations of greater oil concentration for increased efficiency. For mobility, the probe has paddles or a rudder and propeller configuration, as is known in the art.

The probe 25 may be operated remotely, and the camera 42 sends real-time footage of the area and of oil concentrations to the operator who may operate the probe 25 as easily as if onsite. The probe may also be robotic in that it senses the location of the oil and directs itself there to suck up the oil/water mixture.

Figure 6:
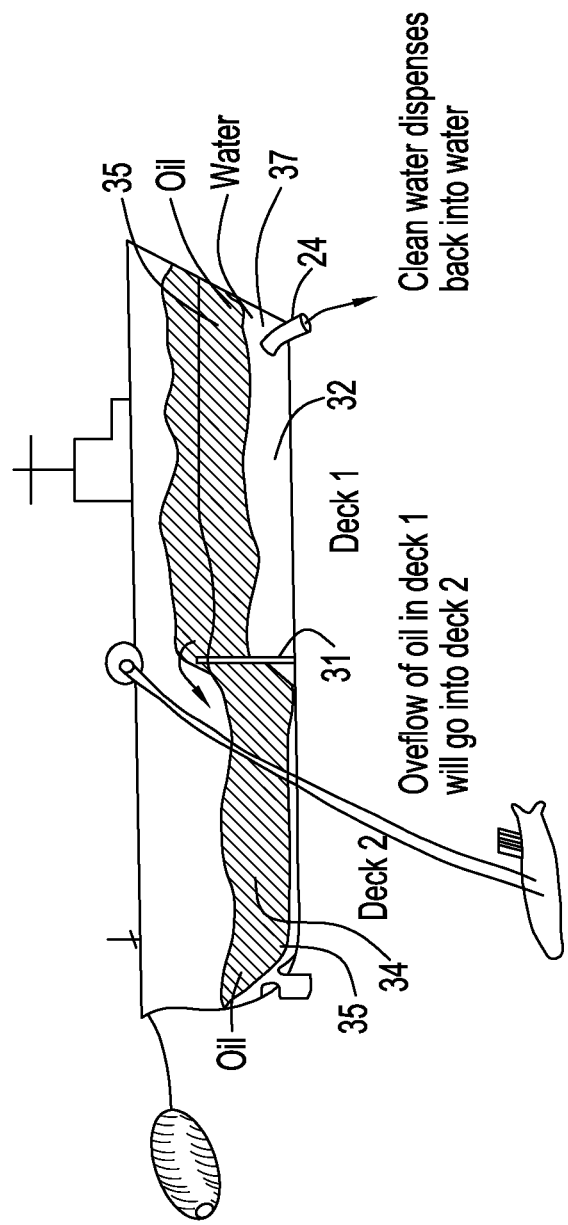
FIG. 6 shows a cut away view of the separator ship, according to one embodiment of the present invention.
Figure 7A:
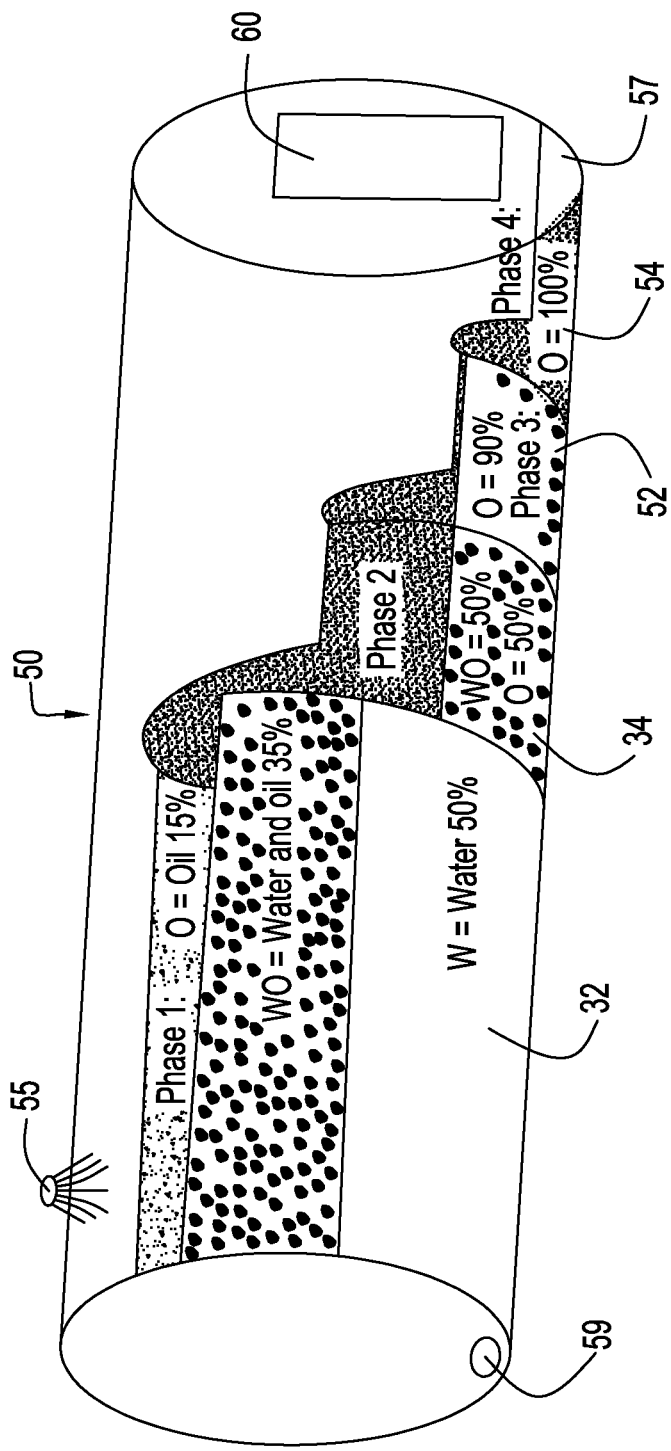
FIG. 7a shows a cut away view of the separator, according to one embodiment of the present invention.
Figure 7B:
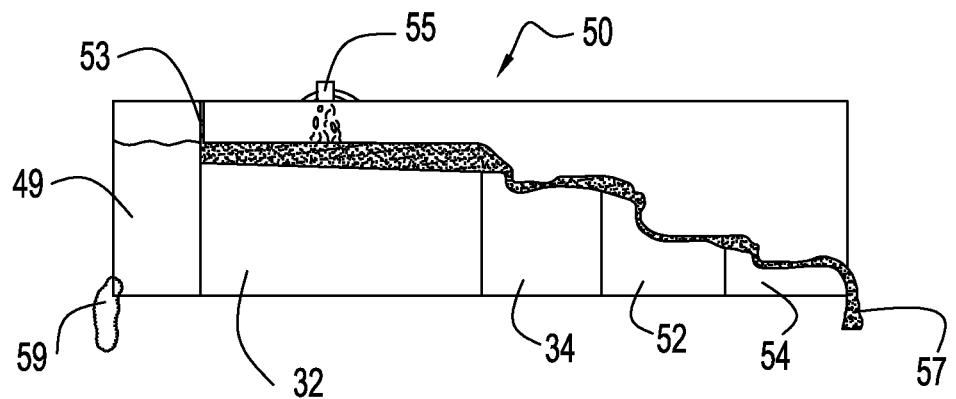
FIG. 7b shows a cut away view of the separator, according to one embodiment of the present invention.
Figure 8:
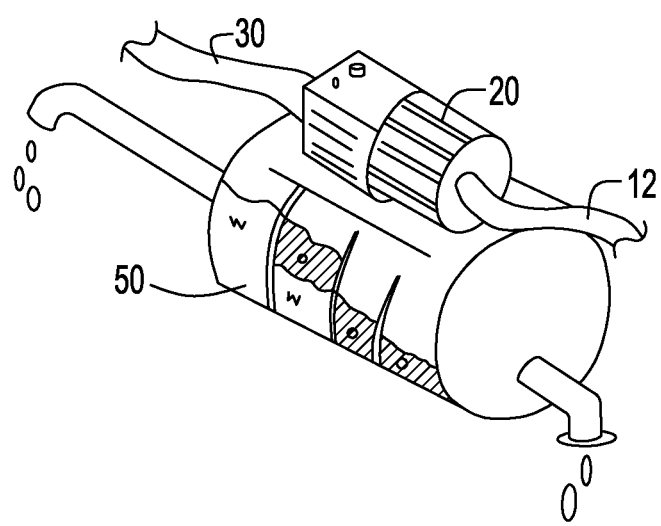
FIG. 8 shows the pump mounted on the separator, according to one embodiment of the present invention.
Figure 9A:
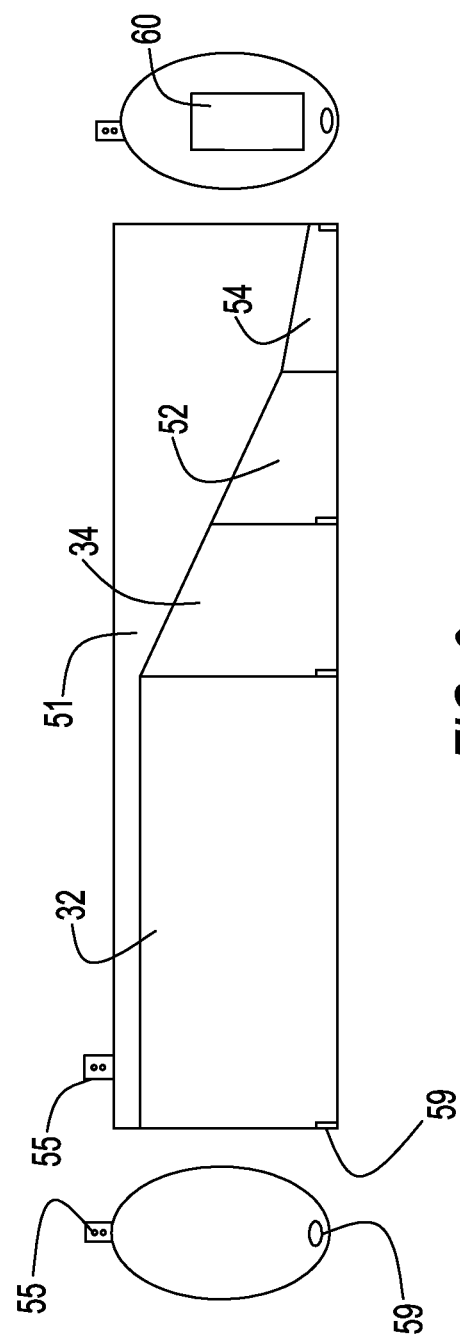
FIG. 9a shows an elevation view of the separator, according to one embodiment of the present invention.

With reference to FIG. 6 the vacuum pump 20 generates a vacuum and can suck up oil and deposit it directly into the ship's first and second tanks 32, 34. The tanks are open to one another at the top, and are separated by a high wall 31 between them, which wall 31 extends 80-95% of the height of the tanks 32, 34. With reference to FIG. 6, the tanks may be organized adjacent lengthwise of the ship, such that one tank is on the port side of the ship and one on the starboard side, or adjacent widthwise of the ship, such that the first tank is in the bow of the ship and the second tank in the stern. In order to prevent listing of the vessel the tanks 32, 34 may take concentric forms, for example, to prevent the oil/water mixture from weighing only one side of the vessel and risk capsizing. Multiple tanks may also be used within the ship in a separator, for further, better separation of oil and water, as discussed below.

The oil/water mixture is pumped from the submersible 15 or the probe 25, through the hoses 12, 30 and into the first tank deck 32. The oil and water can be separated by specific gravity ("gravity separation") as oil is less dense than water and hydrophobic, so the water is pushed to the bottom of the first tank deck and the separation between the oil 35 and water 37 is quite distinct. The first tank deck is filled with the oil/water mixture, which separates as it is filled. With the oil on top, once the level of the first tank overflows into the second, it is only oil that is transferred since the water remains in the bottom of the first tank 32. Any excess volume in the first tank overflows into the second tank deck 34. The clean water at the bottom of the first tank deck 32 will dispense back into the body of water through the nozzle 24, by means of a pump (not shown) or simply by water pressure.

A separator 50 is shown in FIGS. 7a-7b, 8 and 9a-9b, which may be present in the ship 10 (not shown) or a truck (not shown), having a pump 20 above the separator 50 to pull the oil/water mixture in. The separator 50 consists of a number of tanks, in one embodiment four tanks 32, 34, 52, 54. The first tank 32 receives the water/oil mixture from the pump 20, through an entry 55 located above the first tank 32. As the first tanks fills, the oil separates to the top of the tank, and the water separates to the bottom. When full, the tank will have gradients, with almost pure oil at the top, with a mixture of water and oil in the middle, and almost pure water at the bottom. As the mixture settles the gradients are more defined. A typical breakdown in the first tank 32 is 15% pure oil, 35% water/oil mixture, and 50% water. Once full, the first tank 32 overflows, such that the almost pure oil at the top overflows into the second tank 34. The second tank is now 50% oil, and 50% water/oil mixture. As the second tank fills and the oil rises to the top, it overflows into the third tank 52, such that the third tank is 90% oil. The third tank overflows once full, and given that the components have had a chance to settle, the overflow is pure oil and therefore the fourth tank 54 contains 100% pure oil, which may be evacuated through the oil evacuation valve 57, which has a pump (not shown) to facilitate evacuation. The clean water that settles to the bottom of the first tank 32 is evacuated by the water evacuation valve 59 on a lower portion of the first tank 32. There is a mechanical filter 53 between the valve 59 and the tanks 32. In one embodiment the filter extends to the top of the separator 50, and creates an oil free zone 49.

Such a separator may be within the ship or within a truck, for mobile shoreline applications. It may also be operated and monitored remotely. In FIGS. 9a-b and 10a-b, a configuration preferable to a truck is shown, wherein the separator 50 is contained within a truck body 51 and may be entered by a door 60, and the various tanks accessed by steps 65. The separator 50 operates as described above and the water is ejected from the truck once separated.

Figure 10B:
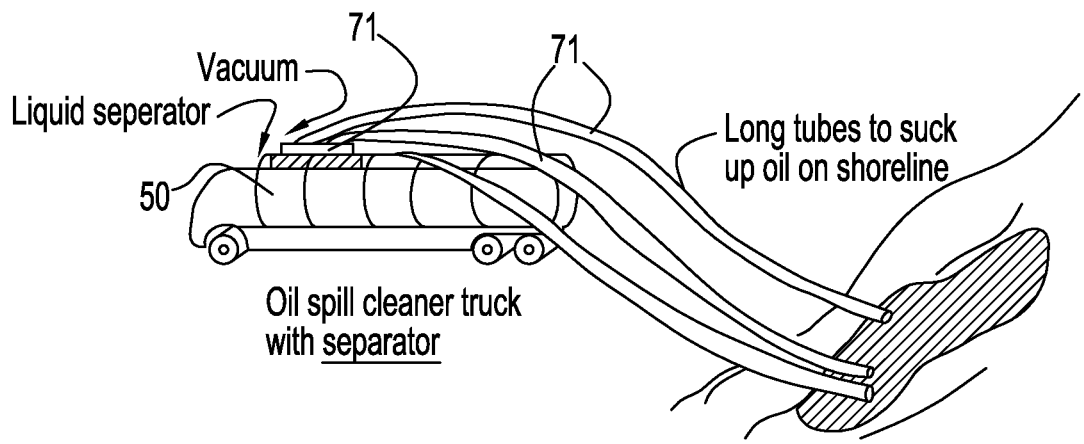
FIG. 10b shows a perspective view of a single truck separator, according to one embodiment of the present invention.

With reference to FIGS. 10a-b, tanker trucks 66 can be used as vessels to remove oil from the shoreline. The trucks 66 are designed to contain a separator 50, which receives an oil/water mixture from a plurality of hoses 72 connected to a pump 71 mounted to the roof of the truck 66. The hoses 72 are inserted into the oil/water mixture, and the pump 71 sucks the mixture into the first tank of the separator (not shown).

Two trucks may implement the two-tank design described above, wherein a first tank 62 is within a first truck 66 and a second tank 64 is within a second truck 67. The oil/water mixture 70 is pumped into the first tank 62 within the first truck 66 by oil spill hoses 72, from a probe 25 or simply vacuuming the shore oil by hand or boat, and a transfer 68 hose at the top of the first truck 66 sucks the separated oil from the top of the first tank 62 and into the second tank 64 where it further separates. Separated water is ejected from the bottom 62a of each tank (not shown for second tank), and after a period of time the second tank 64 will be full of separated oil, at which point it may be hauled away in the second truck 67, and a further truck (not shown) with the same features replaces it The chain of trucks, with a further truck replacing a full second truck, will continue until the cleanup is complete.

Figure 11:
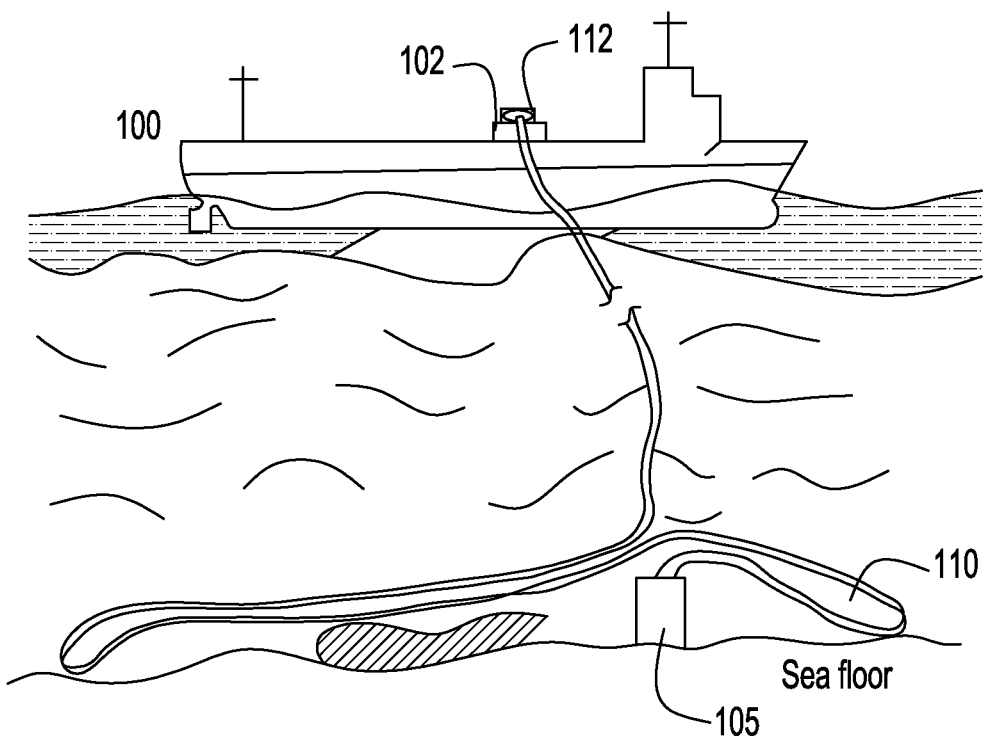
FIG. 11 shows a plan view of a platform connected to a subsea well.

With reference to FIG. 11, a further oil spill safety system comprised of floats for facilitating the retrieval of an undersea hose from a subsea well 105. The subsea well 105 is typically connected to a mobile oil platform 100 with a hose 110 to pump the oil up and into the platform by means of a pump 102. The platform 100 may consist of an oil carrier vessel converted for the purpose of pumping up and storing the oil from the subsea well. The converted oil carrier vessel as platform 100 can drop the hose 110 and depart once full, taking the oil to port, while a replacement oil carrier arrives to serve as platform 100 for the hose 110. The hose opening 112 closes while the hose 110 is not attached to the platform 100 so as to prevent the spilling of oil. Detachment of the hose 110 from the platform 100 is also beneficial in case of an emergency, when the crew and costly equipment can be relocated, rather than remain in place as a fixed oil platform must.

The platform 100 is equipped with a winch. The hose attachment method is as follows: i) once the platform arrives at the well, and retrieve the floats 115 holding the hose 110, the technicians free the cable 113 from the floats 115, which are hooked to the exterior of the vessel for storage; ii) the cable 113 is hooked to the winch, and iii) the hose 110 emerges from the sea, and iv) the hose opening 112 is connected to the platform 100. For detachment, the hose opening 112 is detached from the platform 110; ii) the cable 113 is attached to the hose 110 and the hose 110 lowered into the water by the winch; iii) the floats 115 are reattached to the cable 113; and iv) the floats float in the water holding the hose 110 at a known position.

The benefits of eliminating fixed oil platforms in favour of the described converted oil carrier vessels is the safety benefit of having a platform that is movable from the danger zone; the mobile platform of the converted oil carrier is cheaper and easier to manufacture and deploy; and the fixed structure that is susceptible to water movement and storms is replaced by a long hose that is flexible and allows the platform to move with the elements.

Figure 12:
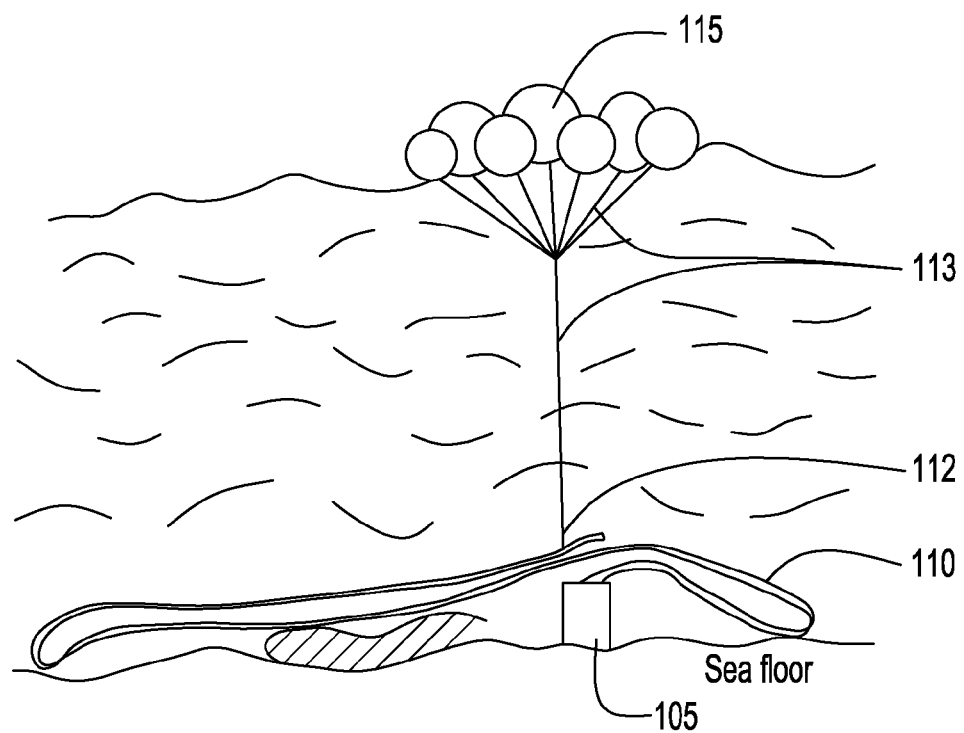
FIG. 12 shows a plan view of floats attached to the subsea well hose.

With reference to FIG. 12, floats 115 hold the hose 100 in an accessible position for the arrival of the next platform 100, and prevent it from sinking. The hose may be connected to the one or more floats by cable 113 or other similar means. The floats 115 contain a substance having a lower density than water, and may consist of robust balloons or gas bags for holding a gas, for example, or foam. Balloons or gas bags have the advantage of portability when not in use, however foam floats do not require inflation or deflation. Multiple floats have the benefit of maintaining floatation despite the failure of one or more of the floats. The floats may have surveillance cameras attached thereto to ensure the security of the subsea well, and to monitor shipping lanes as desired.

Figure 13:
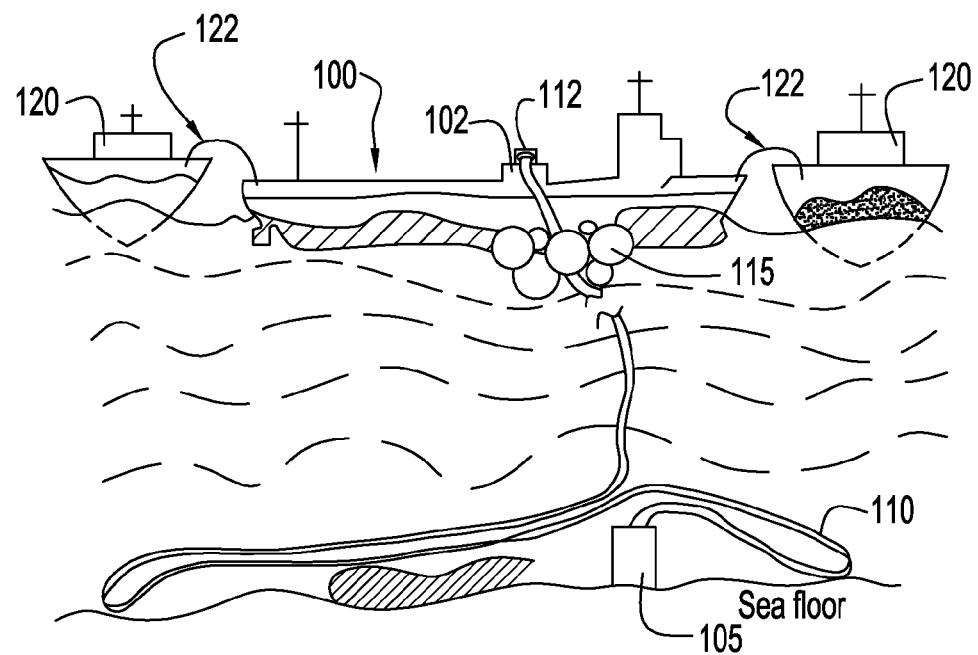
FIG. 13 shows a plan view of the platform and relief vessels above the subsea well.

With reference to FIG. 13, the system is shown, with the platform 100 pumping oil through the hose 110 from the subsea well 105, the hose 110 attached to the platform's pump 102, which pumps the oil. The floats 115 are attached to the hose 110 to facilitate disconnection and connection to another platform 100 in the form of a vessel. In this embodiment, platform 100 is an oil carrier vessel, which can detach the hose 110 and depart when full, to be replaced by another empty oil carrier vessel (not shown). In an embodiment, two further relief vessels 120 are present for receiving oil from the platform 100 via oil transfer hoses 122, to prevent the platform 100 from becoming full and dropping the hose 110.

Figure 14:
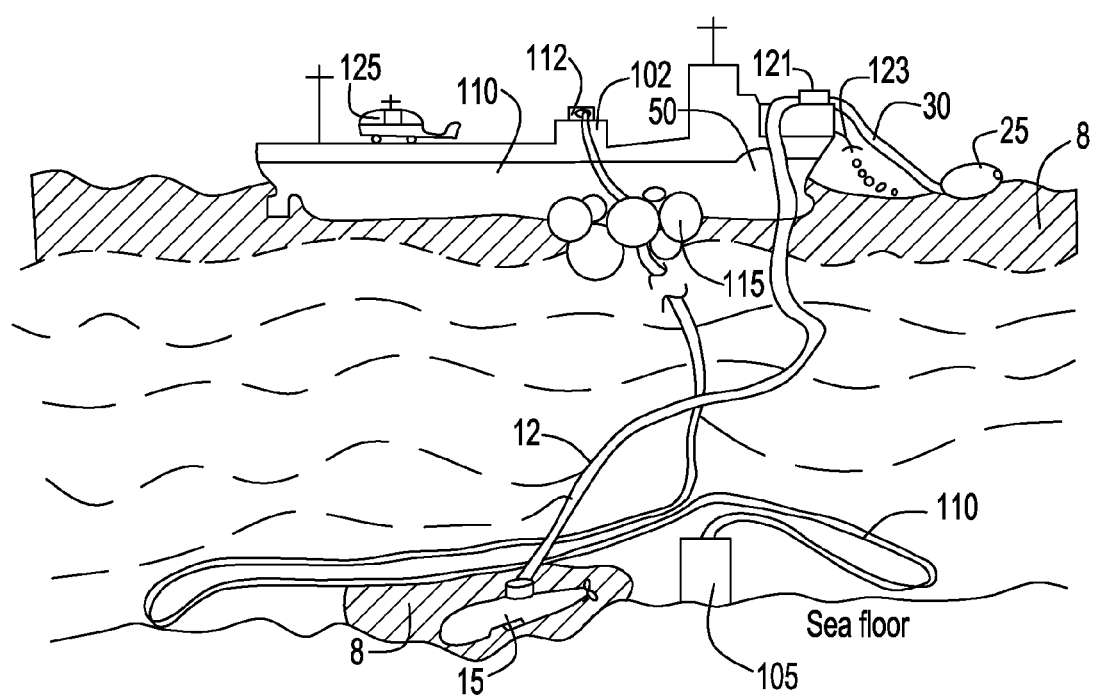
FIG. 14 shows a plan view of the platform and relief vessels above the subsea well, cleaning up an oil spill.

With reference to FIG. 14, the floats 115 are shown on the hose 110 in case the hose 110 is dropped by the platform 100. Further, an oil spill surrounds the platform 100 and the probe 25 is deployed into the oily water as described above to vacuum the oily water into the platform 100 using the pump 121, to which both hoses 12, 30 are attached. In one embodiment, platform 100 is an oil carrier vessel also containing a separator 50 for the spilled oil, which evacuates clean water from the water evacuation valve 123. For example, 80% of the storage capacity may be used for oil storage while 20% of the storage capacity is used for the separator 50. Therefore, the vessel may serve three purposes, as an oil carrier for use as a platform, as a separator for oil spill cleanup, and as an oil carrier/separator for use as a platform with availability for cleanup should the need arise. Further, a submersible 15 is deployed to clean up an underwater spill 8. A helicopter 125 is available for support functions and evacuation.

I claim:

1. An oil spill cleanup system comprising:
   a. a vessel;
   b. a separator within the vessel for separating oil and water, the separator comprising:
      i. four interconnected tanks, wherein a first tank fills with an oil and water mixture, and overflows oil into a second tank, the second tank overflows oil into a third tank, and the third tank overflows oil into a fourth tank, wherein each tank separates oil from water; and
      ii. a water evacuation valve on a lower portion of the first tank with a filter between the valve and the first tank;
   c. a pump configured to create a vacuum and pump an oil/water mixture into the separator; and
   d. one or more floating probes having hoses connected to the pump, for collecting the oil/water mixture,
   wherein the pumps pump the oil/water mixture into the top of the separator, the oil/water mixture separates within the separator such that the oil floats on the water and the surface oil overflows into the adjacent tank, and the water is evacuated from the water evacuation valve; and
   wherein the filter extends to the top of the separator to produce an oil-free zone.

2. The oil spill cleanup system of claim 1, further comprising one or more submersibles connected by a hose to the pump, for collecting the oil/water mixture.

3. The oil spill cleanup system of claim 1, wherein the probes are remotely controlled and maneuverable to the oil/water mixture.

4. The oil spill cleanup system of claim 3, further comprising a camera attached to each probe, wherein the camera(s) is/are configured to identify areas of high oil concentration.

5. The oil spill cleanup system of claim 1, further comprising an oil evacuation valve on the fourth tank.

6. The oil spill cleanup system of claim 1, wherein the vessel is a ship.

7. The oil spill cleanup system of claim 1, wherein the vessel is a truck.

8. The system of claim 1, wherein the filter is a mechanical filter configured to filter the separated water prior to the water being evacuated.

9. The system of claim 1, wherein the one or more probes are maneuverable, and wherein each of the one or more probes comprises a maneuverable sucking tube configured to suck an oil/water mixture.

10. The system of claim 1, wherein the one or more probes are remotely controlled.

11. The system of claim 1, wherein the separator further comprises one or more hoses configured to suck up the oil/water mixture and collect the oil within the separator.

\* \* \* \* \*